United States Patent
Vantu et al.

(10) Patent No.: US 7,768,230 B2
(45) Date of Patent: Aug. 3, 2010

(54) PRESSURE RELIEF VALVE FOR A BATTERY CHARGER

(75) Inventors: Florin Vantu, Malmö (SE); Vijay Sharan, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 172 days.

(21) Appl. No.: 11/994,521

(22) PCT Filed: May 31, 2006

(86) PCT No.: PCT/EP2006/062778

§ 371 (c)(1),
(2), (4) Date: Sep. 12, 2008

(87) PCT Pub. No.: WO2007/003477

PCT Pub. Date: Jan. 11, 2007

(65) Prior Publication Data

US 2009/0027004 A1    Jan. 29, 2009

(30) Foreign Application Priority Data

Jul. 5, 2005  (EP) ................................. 05106100
Sep. 27, 2005  (EP) ................................. 05108912

(51) Int. Cl.
*H02J 7/02* (2006.01)
(52) U.S. Cl. ........................ 320/111; 320/107; 320/147; 429/53
(58) Field of Classification Search ................ 320/107, 320/111, 112, 113, 114, 115, 147
See application file for complete search history.

(56) References Cited

U.S. PATENT DOCUMENTS

| 4,891,270 | A | * | 1/1990 | Jergl et al. ..................... 429/53 |
| 6,004,689 | A | * | 12/1999 | Walker et al. ................. 429/53 |
| 2002/0158605 | A1 | | 10/2002 | Sharrah et al. |
| 2003/0227277 | A1 | | 12/2003 | Small |

FOREIGN PATENT DOCUMENTS

| EP | 1 139 540 | 10/2001 |
| GB | 2 330 959 | 5/1999 |

(Continued)

OTHER PUBLICATIONS

International Search Report for corresponding Application No. PCT/EP2006/062778 dated Aug. 28, 2006.

*Primary Examiner*—Patrick J Assouad
*Assistant Examiner*—Manual Hernandez
(74) *Attorney, Agent, or Firm*—Renner, Otto, Boisselle & Sklar, LLP

(57) ABSTRACT

A battery charger (10) comprising a housing (15) enclosing battery charging electronics (11), an interface (12) connectable to a mains outlet, and a charging current output interface. An aperture (71) is formed in a wall (75) of the housing, and a pressure relief valve (90) is arranged in said aperture, functioning to open and evacuate gas from the interior of the housing to the exterior of the housing when the pressure in the housing exceeds a pressure limit relative the exterior of the housing. In one embodiment, a bushing (90) for a cable (80) interconnecting the battery charging electronics (11) and the charging current output interface acts as the valve.

14 Claims, 3 Drawing Sheets

FOREIGN PATENT DOCUMENTS

| | | |
|---|---|---|
| GB | 2 381 964 | 5/2003 |
| JP | 10-200274 A | 7/1998 |
| RU | 1715156 | 10/1994 |
| RU | 2144275 | 1/2000 |
| WO | 95/01692 | 1/1995 |
| WO | 01/20747 | 3/2001 |

\* cited by examiner

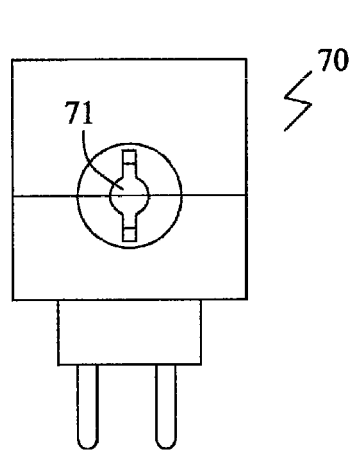
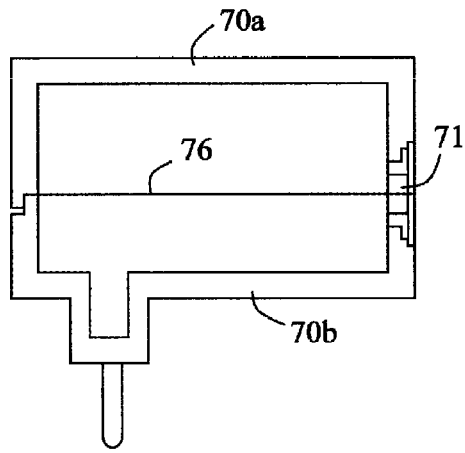
Fig. 7              Fig. 8
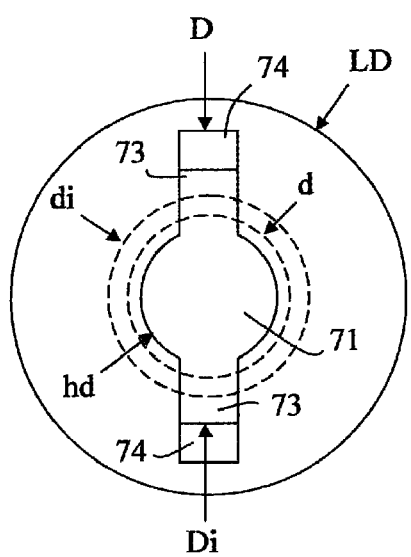
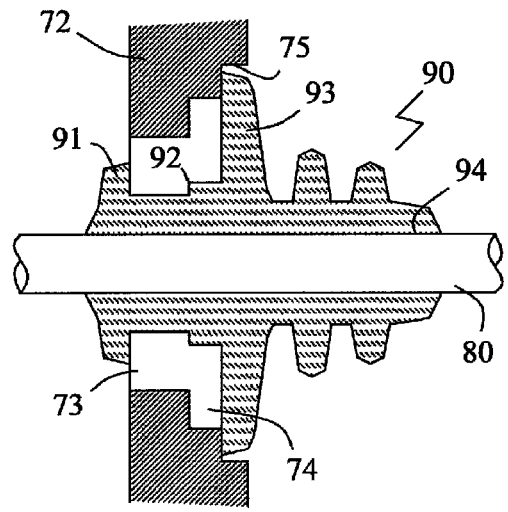
Fig. 9              Fig. 10

PRESSURE RELIEF VALVE FOR A BATTERY CHARGER

FIELD OF THE INVENTION

The present invention relates to the field of battery chargers, specifically chargers connectable between a mains outlet and a battery or battery-carrying electronic device, thereby functioning to receive an AC current from the mains outlet, convert the AC current to a DC current, and supply the DC current to the battery for charging the same. In particular, the invention relates to a solution for relief of a gas pressure inside a housing of an airtight charger.

BACKGROUND OF THE INVENTION

An electronic device needs some form of electric power supply to work. For many electronic devices, particularly portable devices, batteries are preferred over a cord-connection to a mains outlet. While it is possible to change batteries to a fresh set when the charge has drained, it is common practice in many cases to instead make use of re-chargeable batteries. Such batteries may be re-charged using a battery charger connected to a mains outlet.

A battery charger therefore typically includes an interface including a plug connectable to a mains outlet, AC/DC converter electronics arranged in a protective housing, from which housing the plug projects, and a battery interface comprising a connector exterior of the housing. The plug is connected to the AC/DC converter means in the housing for supplying an AC current thereto, and the AC/DC converter means are in turn connected to the battery connector for supplying a DC charging current to a connected battery. The AC/DC converter electronics may be more or less advanced, and may e.g. include a control unit for implementing a predetermined charging scheme adapted to a certain type of battery. In many cases, though, the actual charging control circuitry is instead included in a device carrying the battery, such as a mobile phone, to which device the battery connector is connected. In such solutions, the battery charger is a fairly simple device. The battery interface can include a battery connector comprising a plug or socket for direct attachment of the battery or battery-carrying device, or include a cord having such a plug or socket at its remote free end.

For many electronic devices, a battery charger is supplied when the device is purchased, or may be provided separately. Furthermore, many types of electronic devices and chargers are produced for a global market with little or no difference between different regions or countries. The battery charger is therefore generally a low cost product produced in millions of units, and often supplied all over the world for use in places with varying mains voltage. Battery chargers are also often totally insulated products, for the purpose of avoiding humidity on the converter electronics.

However, in some parts of the world it is more or less common with an irregular, uneven mains voltage, which in extreme conditions may cause a rapid development of heat and gas production inside the charger. This process may be almost instantaneous and the developed gases may not escape out quickly enough from the housing of the charger. Since chargers are often provided for use with portable devices, such as mobile phones, laptop computers, pocket computers and so on, also the chargers are preferably very small for good portability. Furthermore, the smaller the charger, the smaller the space defined within its housing, which tends to result in an even more rapid increase in pressure due to the small enclosed volume. In serious cases, this may lead to a risk of explosion in the charger with subsequent damage to the charger equipment.

SUMMARY OF THE INVENTION

The object behind the present invention is therefore to provide a solution for battery chargers, aimed to prevent the chargers from exploding even if gas—in abnormal conditions—starts building up pressure in the unit.

This object is fulfilled by a battery charger comprising a housing enclosing battery charging electronics, an interface connectable to a mains outlet, and a charging current output interface, wherein an aperture is formed in a wall of the housing, and in that a pressure relief valve is arranged in said aperture, functioning to open and evacuate gas from the interior of the housing to the exterior of the housing when the pressure in the housing exceeds a pressure limit relative the exterior of the housing.

In one embodiment, the pressure relief valve is biased to its closed state, such that the charger will be closed after evacuation of gas from inside the housing.

In one embodiment, the valve comprises a resilient member plugged into the aperture, having a lip resting against an outer surface of the housing wall and being adapted to yield when the pressure in the housing exceeds the pressure limit.

In one embodiment, an inner surface of the lip is in communicative connection with the interior of the housing.

In one embodiment, the resilient member has an inner flange resting against an inner surface of the housing wall.

In one embodiment, a portion of the resilient member is absent from an inner flange, thereby allowing communicative connection from the interior of the housing to the lip.

In one embodiment, the resilient member comprises, interior of the lip, an outer shoulder shaped to abut the housing wall outside of the aperture in, said aperture being generally circular but having a cut to the interior of the housing extending beyond the diameter of the inner flange to permit gas through the aperture.

In one embodiment, a recess is formed in the outer surface of the housing wall outwardly of the cut, forming a pressure chamber inside the outer flange.

In one embodiment, the lip abuts a recess formed in the outer surface of the housing wall.

In one embodiment, the pressure relief valve acts as even as a bushing for a cable connected to the battery charging electronics.

In one embodiment, the cable has a DC charging current output connector located at a free end remote from the housing.

In one embodiment, the cable has an AC charging current input connector located at a free end remote from the housing.

In one embodiment, the charging current output interface comprises a connector shaped to be connectable to a battery charger input port of a mobile phone.

In one embodiment, the housing comprises at least two housing parts connected at a seam, and the aperture extends through said seam.

BRIEF DESCRIPTION OF THE DRAWINGS

Various embodiments of the invention are described below by means of examples with reference to the appended drawings, on which FIG. 1 schematically illustrates a battery charger according to a first embodiment as seen from below;

FIGS. 7 and 8 illustrate different views of a housing for a charger devised according to a second embodiment of the invention;

FIGS. 9 and 10 illustrates schematically how a cable support member is devised to cooperate with a shaped aperture in the housing for providing a pressure releasing device in accordance with the second embodiment;

DETAILED DESCRIPTION OF PREFERRED EMBODIMENTS

The present description relates to the field of battery chargers, particularly battery chargers adapted to charge batteries for portable or handheld devices, such as mobile phones, communicators, electronic organisers, smart phones, PDA:s (Personal Digital Assistants), laptop computers etc. It should be noted, though, that the chargers according to the invention is as such not restricted to use with portable electronic devices. Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

From a design point of view, a battery charger comprises the following parts:

electronic circuits, enclosed in a plastic casing or housing, a mains interface, typically a plug with AC pins to be inserted in a wall socket, and an output interface, typically a connector-fitted DC cable, for connecting the charger to a battery or battery-carrying device.

Apart from the above state of the art features, the charger according to the invention further includes a Pressure Releasing Device (PRD) feature, which is adapted to:

quickly release gases from the housing, in a controlled way and at a predetermined pressure, not allow development of higher, hazardous pressure in the charger, protect against humidity, since the PRD will close again after releasing the pressure, prevent external contact with the internal electronic circuits, even when the PRD has reacted.

Preferably, the charger remains closed even after an event has occurred which triggered the PRD to open and release the pressure. This is an advantageous feature, preventing access to sensitive electronics and avoiding humidity to enter the housing.

Figure 1:
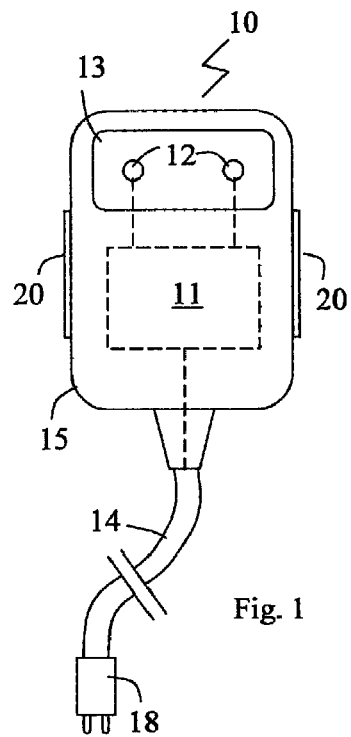

A first embodiment of the invention is shown in FIGS. 1-6, in which the PRD by way of example is incorporated in resilient grip pads, normally made in a rubber-like resilient material. In FIG. 1, a battery charger 10 is shown. Charger 10 comprises electronic circuits 11 for converting an AC voltage to a DC voltage, according to the established art. The electronic circuits 11 are connected to a mains outlet connector 12. In this particular embodiment the mains outlet connector comprises two parallel and spaced apart pins 12 extending from a spacer element 13, devised to connect to a mains outlet socket. However, it is well known that there are other designs for the mains outlet interface used in various countries, and it should be noted that the invention is in no way restricted to the illustrated example. The mains outlet connector may in fact even comprise a socket instead of a plug, for connection to a mains outlet plug. The electronic circuits 11 are further connected to a charging current output connector 18 via a DC cable 14. A casing or housing 15 encloses the electronic circuits 11, and a bushing is provided to support the cable at its connection to housing 15. FIG. 1 further indicates two pressure release devices PRD 20, but it should be noted that only one may suffice or that more than two may be included. The pressure releasing device comprises an aperture leading to a volume or cavity defined in the interior of the housing, and a valve placed in the aperture.

Figure 2:
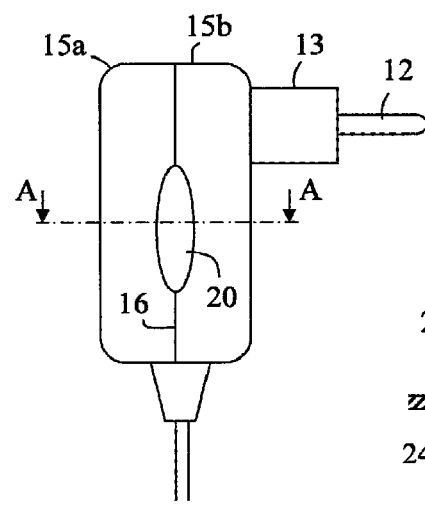
FIG. 2 illustrates the charger of FIG. 1 from a side view.

In FIG. 2, charger 10 is depicted from the side, and from this drawing it is evident that housing 15 comprises at least two housing parts 15a and 15b, which are fixed to each other by a seam 16 by welding, gluing, snap-locking, screwing, or any other affixation method. In this embodiment, the PRD 20 comprises a plug 21 acting as the valve, formed of a resilient material such as e.g. rubber, silicone or thermo-elastic plastic, and placed in an aperture 30 formed in housing 15. As is evident from FIG. 2, the body 21 is preferably located in the seam 16, for easy mounting during manufacture. An alternative variant is to form the aperture without passing the seam, and subsequently pressing the resilient body into place.

In one embodiment, the valve may comprise a rigid or resilient body, which is spring-loaded towards a valve seat defined in or outside a rim defining the aperture. Preferably, though, the body comprises in itself a resilient or elastic portion providing the valve function, as is explained below.

Figure 3:
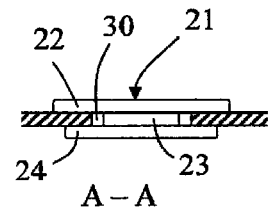
FIG. 3 is a transverse cross-sectional view of a portion of the charger showing a pressure releasing device according to the first embodiment.

FIG. 3 schematically illustrates a cross-sectional view through A—A as shown in FIG. 2, from which it is clear how body 21 is placed in aperture 30. In this embodiment and in this orientation, body 21 comprises an outer flange or lip 22 abutting against a surface of an outer wall of housing 15, an inner flange 24 abutting against a surface of an inside wall of housing 15, and a central portion 23 being narrower than and connecting the two flanges.

Figure 4:
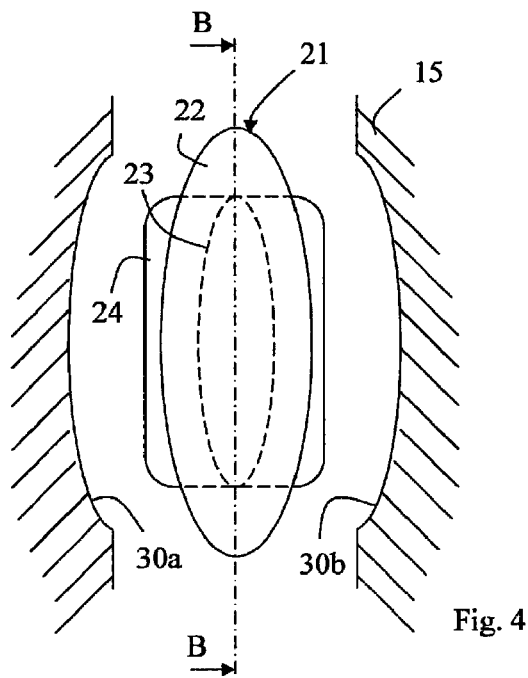
FIG. 4 illustrates a close-up and partly exploded view of the pressure releasing device of FIG. 3.
Figure 5:
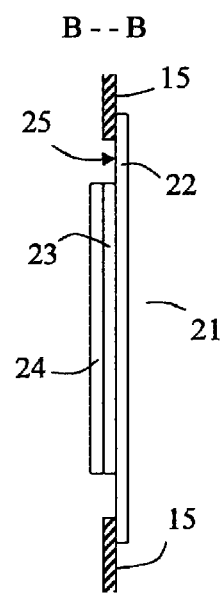
FIGS. 5 and 6 illustrate a longitudinal cross-sectional view of the pressure releasing device according to two alternative solutions of the first embodiment.
Figure 6:
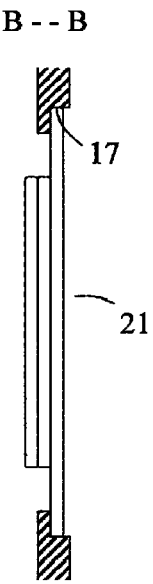

However, in order for an over pressure to be eliminated by gas evacuation, there has to be gas communication from the interior to the exterior of housing 15. For this purpose, the inner flange is shaped such that it is present only at certain portions about the inner periphery of aperture 30, and absent at another portion. This is schematically illustrated in FIGS. 4-6. FIG. 4 illustrates body 21 present between two housing parts 15a and 15b before assembly. Aperture 30 is thus not yet formed, but its boundaries are formed at edge portions 30a and 30b in the housing parts 15a and 15b, respectively. From the drawings it is clear that outer flange 22 has a (oval) shape which more or less corresponds to that of aperture 30, but which extends beyond the periphery of aperture 30 to seal the same. Central portion 23 is smaller than aperture 30, in order to provide gas communication between the housing edge of the aperture 30 and the central portion 23. However, the inner flange 24 has a shape which deviates from the aperture 30, in that flange 24 extends beyond the edge 30a, 30b of aperture 30 at the longitudinal sides, to the left and right in the drawing, but not at the shorter ends, i.e. the upper and lower ends in the drawing. At those shorter ends gas may consequently flow freely towards an inner surface 25 of outer flange 22 to expose it to pressure. FIG. 5 illustrates a cross-sectional side view through B-B indicated in FIG. 4, from which it is clear how the outer flange 22 rests against the outside of housing wall 15, and that inner surface 25 of the outer flange is exposed to the gas pressure interior of the housing. FIG. 6 illustrates, by way of example, a modified version of this embodiment, in which flange 22 is positioned in a recess 17 in the housing, in order to make it more difficult to tamper with the charger to lift or even remove the body 21.

FIGS. 7-10 illustrate by way of example a second embodiment of the invention. In this embodiment, the PRD is incorporated in a strain relief bushing on a cable connected to the housing of the charger, such as a DC cable for the output connector or an AC cable for the mains connector. This way the PRD function is built-in without any substantial additional costs, if the strain relief bushing is fitted to the cable in question anyway. In the illustrated example, the pressure relief device is incorporated in the DC cable.

FIGS. 7 and 8 illustrate a housing 70 for a battery charger. A mains plug is illustrated, whereas the electronic circuits are left out. Housing 70 has an aperture 71 shaped in a seam 76 between two housing parts 70a and 70b. Normally the housing parts are assembled via ultrasonic welding, but other methods are possible as mentioned above. For easy insertion, the cable with the special strain relief including the pressure releasing device is preferably located in the parting plane between top and bottom part of the charger housing.

Aperture 71 has a special shape which will be outlined in detail, and is also used for leading a cable between the charging electronics inside housing 70 and the charging current connector located at the far end of the cable (not shown).

FIG. 10 shows a cross-section of the housing 70 with aperture 71 in housing wall 72, through which a cable 80 is let through. Cable 80 is attached by means of a bushing 90 for the cable being clamped in the aperture. This bushing has a particular design and acts as the valve in accordance with this embodiment of the invention. Cable 80 is preferably integrated with or securely attached in a through-bore 94 of bushing 90. One alternative is to use a bushing which is over-moulded on the cable. In FIG. 10, the left side of housing wall 72 represents the interior of the housing 70 and the right side of housing wall 72 represents the exterior of the housing 70.

In FIG. 9 aperture 71 is seen from the front as in FIG. 7, but also with some diameters of bushing 90 shown with dashed lines. Aperture 71 is in the shown embodiment generally circular with a diameter hd. However, other shapes of the bushing middle part which secure the cable against rotation may be preferred, such as triangular, rectangular or other polygonal shape. In this sense, the word diameter is still used to denote an outermost perimeter from a central point or axis.

Inside the housing 70, bushing 90 abuts with an inner flange 91 having a diameter di. At the exterior of the aperture 71 the bushing 90 has a shoulder 92 with a diameter d. As is seen in FIGS. 7-10 the aperture 71 is not completely circular but is provided with a cut 73 and a recess 74. The cut 73 has a dimension Di greater than di. Thus, the inner flange 91 does not cover the entire aperture but there is an air-escape way through the cut 73 leading to the recess 74, which forms a pressure chamber at the exterior side of the wall 72. The pressure chamber 74 extends to a dimension D. This recess 74 might be very ground, typically between 0.05-1 mm, and preferably between 0.1 and 0.5 mm, e.g. about 0.2 mm, but its existence provides an advantageous contribution for obtaining an improved function. Between this inner wall of the recess and the external lip 93 the pressure chamber 74 formed, which is in permanent connection with the space in the charger body, via the cut 73. The surface of the recess and the yieldable lip's pre-tension and material's properties are elements which may be designed to determine the opening pressure for the pressure relief valve function.

The pressure chamber 74 is closed by outer flange or lip 93 of bushing 90. The outer flange 93 is preferably accommodated inside a further shoulder 75 on the exterior surface of the housing 1. The diameter of the outer flange 93 is LD which is greater than the dimension D of the pressure chamber. The bushing 90 is preferably made of any of the aforementioned elastic materials. When the pressure in the pressure chamber 74 exceeds a limit the outer flange will yield to evacuate gases from the pressure chamber 74 to the outside of the housing. In this way, the bushing 90 with the lip 93 provides pressure relief for the housing 70 via the air escape way through the cut 73, the pressure chamber 74 and the yieldable lip 93. The valve function achieved is biased to its closed position, by means of the shape and resiliency of the bushing 90. The same goes for the embodiment of FIGS. 1-6, where it is the shape and resiliency of body 21 which guarantees the one-way function of the valve.

The most common embodiment of a battery charger is to employ a housing carrying the converter electronics and a mains plug, whereas the DC connector is fitted to the far end of a cable connected to the electronics in the housing, which is the design presented in the embodiments of FIGS. 1-10. It should be noted, though, that alternative embodiments are possible, as is explained with reference to FIGS. 11-14. The mains plug, for one thing, may also be connected to a remote end of an AC cable attached to the housing. Likewise, the DC connector may be fitted directly on the housing. A charger according to the invention may thus comprise no cables, one AC cable, one DC cable, or one AC cable and one DC cable. Furthermore, the mains plug exists in different shapes, making the charger country- or region-dedicated.

Figure 11:
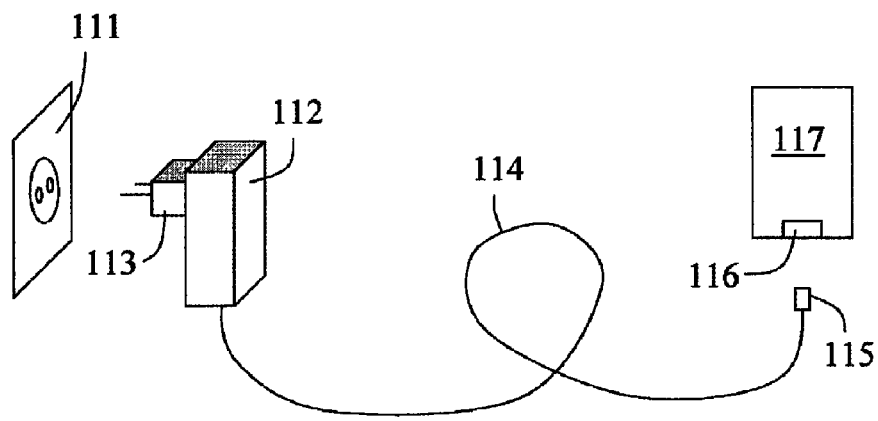
FIG. 11 illustrates an embodiment of a charger with a DC cable.

FIG. 11 shows a design corresponding to the previous drawings, with a charger housing 112 containing the charging converter electronics, a mains plug 113 fitted on housing 112, for connection to a mains outlet 111. Housing 112 is also fitted with a DC output cable 114 carrying a DC connector 115 at its remote end, for connection to a socket 116 of a battery or battery-carrying device 117.

Figure 12:
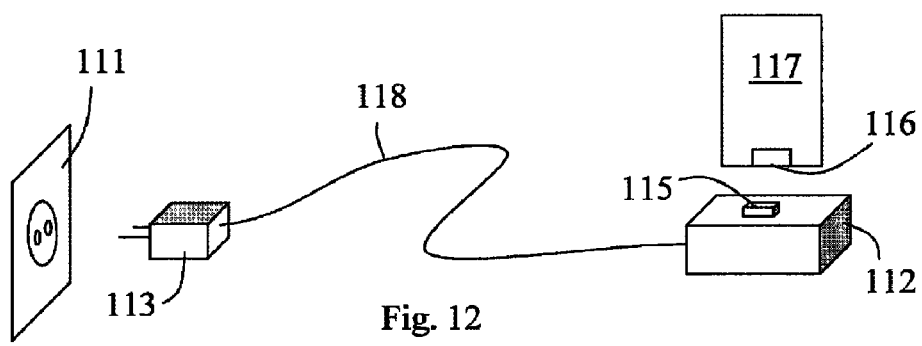
FIG. 12 illustrates an embodiment of a charger with an AC cable.

FIG. 12 illustrates a first alternative design, where charger housing 112 containing the charging converter electronics is connected to mains plug 113 via an AC cable 118, for connection to mains outlet 111. Housing 112 is fitted with a DC connector 115 and preferably some form of socket for securely attaching battery or device 117 with its socket 116.

Figure 13:
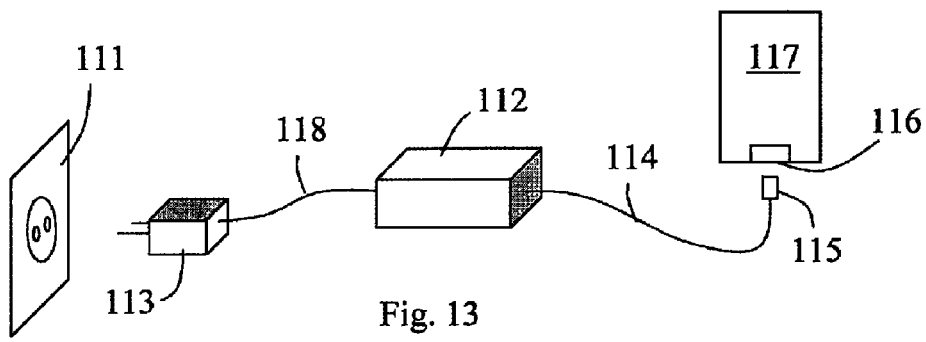
FIG. 13 illustrates an embodiment of a charger with both a DC cable and an AC cable.

FIG. 13 illustrates a second alternative design, where charger housing 112 containing the charging converter electronics is connected to mains plug 113 via an AC cable 118, for connection to mains outlet 111, and to a DC output cable 114 carrying a DC connector 115 at its remote end, for connection to a socket 116 of a battery or battery-carrying device 117.

Figure 14:
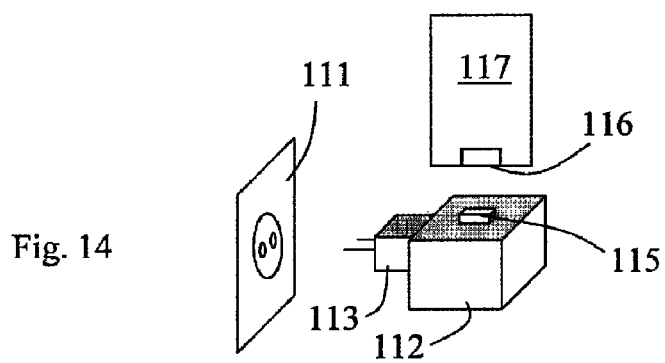
FIG. 14 illustrates an embodiment of a charger with no cables.

FIG. 14 illustrates a third alternative design, where both mains plug 113 for connection to mains outlet 111 and DC connector 115 for connection to socket 116 of battery or device 117, are directly fitted on housing 112.

As previously mentioned, battery-carrying device 117 may e.g. be a mobile phone, a communicator, an electronic organiser, a PDA, or a laptop computer. Further alternatives include a camera, a media player such as a DVD or mp3 player, electronic toys, and so on.

The invention has been described by means of reference to examples of embodiments, but it be understood that variations within the scope of the appended claims are plausible. Certain elements have been described in more or less detail even though the actual realisation of those elements are of little or no importance to the invention. For instance, the mains plug need not be located to extend at an angle from a charging cable, but may instead extend in the opposite direction of the cable. The seam provided between two housing parts, if at all present, may just as well be provided through e.g. a longitudinal plane in FIG. 7, or have an irregular shape. Furthermore, a charger completely without cable is also possible, provided there is a connector for attaching a battery or battery-carrying device. It should also be noted that the feature of combining the cable bushing with the valve body as described in conjunction with FIGS. 7-10, could just as well be implemented for the embodiment described with reference to FIGS. 1-6.

The invention claimed is:

1. A battery charger comprising a housing enclosing battery charging electronics, an interface connectable to a mains outlet, and a charging current output interface, wherein an aperture is formed in a wall of the housing, and a pressure relief valve is arranged in said aperture, functioning to open and evacuate gas from an interior of the housing to an exterior of the housing when the pressure in the housing exceeds a pressure limit relative the exterior of the housing.

2. The battery charger according to claim 1, wherein the pressure relief valve is biased to its closed state, such that the charger will be closed after evacuation of gas from inside the housing.

3. The battery charger according to claim 1, wherein the valve comprises a resilient member plugged into the aperture, having a lip resting against an outer surface of the housing wall and being adapted to yield when the pressure in the housing exceeds the pressure limit.

4. The battery charger according to claim 3, wherein an inner surface of the lip is in communicative connection with the interior of the housing.

5. The battery charger according to claim 3, wherein the resilient member has an inner flange resting against an inner surface of the housing wall.

6. The battery charger according to claim 5, wherein a portion of the resilient member is absent from the inner flange, thereby allowing communicative connection from the interior of the housing to the lip.

7. The battery charger according to claim 5, wherein the resilient member comprises, interior of the lip, an outer shoulder shaped to abut the housing wall outside of the aperture, said aperture being generally circular but having a cut to the interior of the housing extending beyond the diameter of the inner flange to permit gas through the aperture.

8. The battery charger according to claim 7, wherein a recess is formed in the outer surface of the housing wall outwardly of the cut, forming a pressure chamber inside an outer flange.

9. The battery charger according to claim 3, wherein the lip abuts a recess formed in the outer surface of the housing wall.

10. The battery charger according to claim 1, wherein the pressure relief valve acts as a bushing for a cable connected to the battery charging electronics.

11. The battery charger according to claim 10, wherein the cable has a DC charging current output connector located at a free end remote from the housing.

12. The battery charger according to claim 10, wherein the cable has an AC charging current input connector located at a free end remote from the housing.

13. The battery charger according to claim 1 wherein the charging current output interface comprises a connector shaped to be connectable to a battery charger input port of a mobile phone.

14. The battery charger according to claim 1, wherein the housing comprises at least two housing parts connected at a seam, and in that the aperture extends through said seam.

* * * * *

UNITED STATES PATENT AND TRADEMARK OFFICE
CERTIFICATE OF CORRECTION

| | | |
|---|---|---|
| PATENT NO. | : 7,768,230 B2 | |
| APPLICATION NO. | : 11/994521 | |
| DATED | : August 3, 2010 | |
| INVENTOR(S) | : Florin Vantu and Vijay Sharan | |

It is certified that error appears in the above-identified patent and that said Letters Patent is hereby corrected as shown below:

On the title page, item [60] under a heading for Related U.S. Application Data, -- Provisional Application No. 60/735,155 filed on November 9, 2005 -- should be added.

Signed and Sealed this
Twenty-eighth Day of December, 2010

David J. Kappos
*Director of the United States Patent and Trademark Office*